US011849507B2

(12) United States Patent
Khlass et al.

(10) Patent No.: US 11,849,507 B2
(45) Date of Patent: Dec. 19, 2023

(54) TEMPORARY IDENTIFICATION FOR A TERMINAL DEVICE

(71) Applicant: Nokia Technologies Oy, Espoo (FI)

(72) Inventors: Ahlem Khlass, Nozay (FR);
Jussi-Pekka Koskinen, Oulu (FI);
Samuli Heikki Turtinen, Ii (FI);
Rapeepat Ratasuk, Inverness, IL (US)

(73) Assignee: Nokia Technologies Oy, Espoo (FI)

( * ) Notice: Subject to any disclaimer, the term of this patent is extended or adjusted under 35 U.S.C. 154(b) by 210 days.

(21) Appl. No.: 17/214,209

(22) Filed: Mar. 26, 2021

(65) Prior Publication Data
US 2022/0312187 A1    Sep. 29, 2022

(51) Int. Cl.
*H04W 8/22* (2009.01)
*H04W 76/27* (2018.01)
*H04W 36/08* (2009.01)
*H04W 76/11* (2018.01)

(52) U.S. Cl.
CPC ............. *H04W 8/22* (2013.01); *H04W 36/08* (2013.01); *H04W 76/27* (2018.02); *H04W 76/11* (2018.02)

(58) Field of Classification Search
CPC ....... H04W 4/70; H04W 48/02; H04W 48/18; H04W 8/24; H04W 8/22; H04W 36/08; H04W 76/27; H04W 76/11; H04W 48/20; H04W 8/26; H04W 76/19
See application file for complete search history.

(56) References Cited

U.S. PATENT DOCUMENTS

| 2019/0021128 A1 | 1/2019 | Sivavakeesar |
| 2019/0297661 A1 | 9/2019 | Lee et al. |
| 2020/0163149 A1 | 5/2020 | Mildh et al. |
| 2020/0229076 A1 | 7/2020 | Jin et al. |

FOREIGN PATENT DOCUMENTS

| WO | 2019/226107 A1 | 11/2019 |
| WO | 2021/010786 A1 | 1/2021 |
| WO | WO-2022072145 A1 * | 4/2022 |

OTHER PUBLICATIONS

"3rd Generation Partnership Project; Technical Specification Group Radio Access Network; NR; Radio Resource Control (RRC) protocol specification(Release 16)", 3GPP TS 38.331, V16.3.1, Jan. 2021, pp. 1-932.

(Continued)

*Primary Examiner* — Nam T Huynh
(74) *Attorney, Agent, or Firm* — Brake Hughes Bellermann LLP

(57) ABSTRACT

A method comprising receiving, from a network node, a temporary terminal device identity that identifies a type of a terminal device; transitioning to a radio resource control inactive state or to a radio resource control idle state; and transmitting a radio resource control request message comprising the temporary terminal device identity that identifies a type of a terminal device, wherein the radio resource control request message comprises: a radio resource control connection resume request message, if the transition was to the radio resource control inactive state; or a radio resource control setup request message if the transition was to the radio resource control idle state.

17 Claims, 7 Drawing Sheets

(56) References Cited

OTHER PUBLICATIONS

"New SID on Support of Reduced Capability NR Devices", 3GPP TSG RAN Meeting #86, RP-193238, Agenda : 9.1.1, Ericsson, Dec. 9-12, 2019, 5 pages.

"3rd Generation Partnership Project; Technical Specification Group Radio Access Network; Study on support of reduced capability NR devices(Release 17)", 3GPP TR 38.875, V1.0.0, Dec. 2020, pp. 1-112.

"3rd Generation Partnership Project; Technical Specification Group Radio Access Network; NR; NR and NG-RAN Overall Description; Stage 2(Release 16)", 3GPP TS 38.300, V16.4.0, Dec. 2020, pp. 1-149.

"3rd Generation Partnership Project; Technical Specification Group Radio Access Network; NR; User Equipment (UE) procedures in Idle mode and RRC Inactive state (Release 16)", 3GPP TS 38.304, V16.3.0, Dec. 2020, pp. 1-39.

"New WID: UE Power Saving in NR", 3GPP TSG RAN Meetings #87e, RP-200494, Agenda : 9.3.6, CATT, Mar. 16-19, 2020, 5 pages.

"Identification and Access Restriction for RedCap", 3GPP TSG-RAN WG1 Meeting #102-e, R1-2005238, Agenda : 8.6.5, Ericsson, Aug. 17-28, 2020, pp. 1-4.

"Identification and Access Restriction for Reduced Capability NRDevices", 3GPP TSG RAN WG1 Meeting #102-e, R1-2005718, Agenda : 8.6.5, CATT, Aug. 17-28, 2020, 2 pages.

"Early Identification of Redcap Ues", 3GPP TSG RAN WG2 Meeting #112-e, R2-2009670, Agenda : 8.12.2.2, Lenovo, Nov. 2-13, 2020, 4 pages.

"Summary on [102-e-NR-RedCap-04]", 3GPP TSG RAN WG1 #102-e, R1-200xxxx, Agenda : 8.6.4, Moderator (NTT Docomo, Inc.), Aug. 17-28, 2020, 14 pages.

"3rd Generation Partnership Project; Technical Specification Group Services and System Aspects;Study on enhancements for cyber-physical control applications in vertical domains; Stage 1 (Release 17)", 3GPP TR 22.832, V17.3.0, Sep. 2020, pp. 1-87.

"3rd Generation Partnership Project; Technical Specification Group Services and System Aspects;Service requirements for cyber-physical control applications in vertical domains; Stage 1 (Release 17)", 3GPP TS 22.104, V17.4.0, Sep. 2020, pp. 1-76.

"3rd Generation Partnership Project; Technical Specification Group Services and System Aspects;Study on Communication for Automation in Vertical Domains(Release 16)", 3GPP TR 22.804, V16.3.0, Jul. 2020, pp. 1-197.

International Search Report and Written Opinion received for corresponding Patent Cooperation Treaty Application No. PCT/EP2022/051907, dated May 19, 2022, 11 pages.

\* cited by examiner

TEMPORARY IDENTIFICATION FOR A TERMINAL DEVICE

FIELD

The following exemplary embodiments relate to wireless communication and signaling between a terminal device and a network.

BACKGROUND

Wireless communication enables connectivity for various types of terminal devices. The network may provide various services and suitability of such services may be better for certain types of terminal devices compared to other types of terminal devices. Before a terminal device is served by the network, signaling is to take place between the terminal device and the network.

BRIEF DESCRIPTION

The scope of protection sought for various embodiments is set out by the independent claims. The exemplary embodiments and features, if any, described in this specification that do not fall under the scope of the independent claims are to be interpreted as examples useful for understanding various embodiments of the invention.

According to a first aspect there is provided an apparatus comprising at least one processor, and at least one memory including a computer program code, wherein the at least one memory and the computer program code are configured, with the at least one processor, to cause the apparatus to receive, from a network node, a temporary terminal device identity that identifies a type of a terminal device, transition to a radio resource control inactive state or to a radio resource control idle state; and transmit a radio resource control request message comprising the temporary terminal device identity that identifies a type of a terminal device, wherein the radio resource control request message comprises: a radio resource control connection resume request message, if the transition was to the radio resource control inactive state; or a radio resource control setup request message if the transition was to the radio resource control idle state.

According to a second aspect there is provided an apparatus comprising means for receiving, from a network node, a temporary terminal device identity that identifies a type of a terminal device; transitioning to a radio resource control inactive state or to a radio resource control idle state; and transmitting a radio resource control request message comprising the temporary terminal device identity that identifies a type of a terminal device, wherein the radio resource control request message comprises: a radio resource control connection resume request message, if the transition was to the radio resource control inactive state; or a radio resource control setup request message if the transition was to the radio resource control idle state.

According to a third aspect there is provided a method comprising receiving, from a network node, a temporary terminal device identity that identifies a type of a terminal device; transitioning to a radio resource control inactive state or to a radio resource control idle state; and transmitting a radio resource control request message comprising the temporary terminal device identity that identifies a type of a terminal device, wherein the radio resource control request message comprises: a radio resource control connection resume request message, if the transition was to the radio resource control inactive state; or a radio resource control setup request message if the transition was to the radio resource control idle state.

According to a fourth aspect there is provided a computer program comprising instructions for causing an apparatus to perform at least the following: receive, from a network node, a temporary terminal device identity that identifies a type of a terminal device, transition to a radio resource control inactive state or to a radio resource control idle state; and transmit a radio resource control request message comprising the temporary terminal device identity that identifies a type of a terminal device, wherein the radio resource control request message comprises: a radio resource control connection resume request message, if the transition was to the radio resource control inactive state; or a radio resource control setup request message if the transition was to the radio resource control idle state.

According to a fifth aspect there is provided a computer program product comprising instructions for causing an apparatus to perform at least the following: receive, from a network node, a temporary terminal device identity that identifies a type of a terminal device, transition to a radio resource control inactive state or to a radio resource control idle state; and transmit a radio resource control request message comprising the temporary terminal device identity that identifies a type of a terminal device, wherein the radio resource control request message comprises: a radio resource control connection resume request message, if the transition was to the radio resource control inactive state; or a radio resource control setup request message if the transition was to the radio resource control idle state.

According to a sixth aspect there is provided a computer program comprising instructions stored thereon for performing at least the following: receive, from a network node, a temporary terminal device identity that identifies a type of a terminal device, transition to a radio resource control inactive state or to a radio resource control idle state; and transmit a radio resource control request message comprising the temporary terminal device identity that identifies a type of a terminal device, wherein the radio resource control request message comprises: a radio resource control connection resume request message, if the transition was to the radio resource control inactive state; or a radio resource control setup request message if the transition was to the radio resource control idle state.

According to a seventh aspect there is provided a non-transitory computer readable medium comprising program instructions for causing an apparatus to perform at least the following: receive, from a network node, a temporary terminal device identity that identifies a type of a terminal device, transition to a radio resource control inactive state or to a radio resource control idle state; and transmit a radio resource control request message comprising the temporary terminal device identity that identifies a type of a terminal device, wherein the radio resource control request message comprises: a radio resource control connection resume request message, if the transition was to the radio resource control inactive state; or a radio resource control setup request message if the transition was to the radio resource control idle state.

According to an eight aspect there is provided non-transitory computer readable medium comprising program instructions stored thereon for performing at least the following: receive, from a network node, a temporary terminal device identity that identifies a type of a terminal device, transition to a radio resource control inactive state or to a radio resource control idle state; and transmit a radio resource control request message comprising the temporary terminal device identity that identifies a type of a terminal device, wherein the radio resource control request message comprises: a radio resource control connection resume request message, if the transition was to the radio resource control inactive state; or a radio resource control setup request message if the transition was to the radio resource control idle state.

According to a ninth aspect there is provided an apparatus comprising at least one processor, and at least one memory including a computer program code, wherein the at least one memory and the computer program code are configured, with the at least one processor, to cause the apparatus to receive, from a terminal device, a radio resource control request message comprising a temporary terminal device identity that identifies a type of the terminal device, determine if the type of the terminal device is identified from the temporary terminal device identity, and if it is identified, determine, based on the type of the terminal device, a decision regarding the terminal device, wherein the decision comprises one or more of the following: if access to a network is to be restricted for the terminal device; if the terminal device is to be scheduled for a connection establishment; if the terminal device is to be scheduled for a connection resume; identifying a feature support of the terminal device; or determining a modulation and coding scheme the terminal device is capable of using.

According to a tenth aspect there is provided an apparatus comprising means for receiving, from a terminal device, a radio resource control request message comprising a temporary terminal device identity that identifies a type of the terminal device, determining if the type of the terminal device is identified from the temporary terminal device identity, and if it is identified, determining, based on the type of the terminal device, a decision regarding the terminal device, wherein the decision comprises one or more of the following: if access to a network is to be restricted for the terminal device; if the terminal device is to be scheduled for a connection establishment; if the terminal device is to be scheduled for a connection resume; identifying a feature support of the terminal device; or determining a modulation and coding scheme the terminal device is capable of using.

According to an eleventh aspect there is provided a method comprising receiving, from a terminal device, a radio resource control request message comprising a temporary terminal device identity that identifies a type of the terminal device, determining if the type of the terminal device is identified from the temporary terminal device identity, and if it is identified, determining, based on the type of the terminal device, a decision regarding the terminal device, wherein the decision comprises one or more of the following: if access to a network is to be restricted for the terminal device; if the terminal device is to be scheduled for a connection establishment; if the terminal device is to be scheduled for a connection resume; identifying a feature support of the terminal device; or determining a modulation and coding scheme the terminal device is capable of using.

According to a twelfth aspect there is provided a computer program comprising instructions for causing an apparatus to perform at least the following: receive, from a terminal device, a radio resource control request message comprising a temporary terminal device identity that identifies a type of the terminal device, determine if the type of the terminal device is identified from the temporary terminal device identity, and if it is identified, determine, based on the type of the terminal device, a decision regarding the terminal device, wherein the decision comprises one or more of the following: if access to a network is to be restricted for the terminal device; if the terminal device is to be scheduled for a connection establishment; if the terminal device is to be scheduled for a connection resume; identifying a feature support of the terminal device; or determining a modulation and coding scheme the terminal device is capable of using.

According to a thirteenth aspect there is provided a computer program product comprising instructions for causing an apparatus to perform at least the following: receive, from a terminal device, a radio resource control request message comprising a temporary terminal device identity that identifies a type of the terminal device, determine if the type of the terminal device is identified from the temporary terminal device identity, and if it is identified, determine, based on the type of the terminal device, a decision regarding the terminal device, wherein the decision comprises one or more of the following: if access to a network is to be restricted for the terminal device; if the terminal device is to be scheduled for a connection establishment; if the terminal device is to be scheduled for a connection resume; identifying a feature support of the terminal device; or determining a modulation and coding scheme the terminal device is capable of using.

According to a fourteenth aspect there is provided a computer program comprising instructions stored thereon for performing at least the following: receive, from a terminal device, a radio resource control request message comprising a temporary terminal device identity that identifies a type of the terminal device, determine if the type of the terminal device is identified from the temporary terminal device identity, and if it is identified, determine, based on the type of the terminal device, a decision regarding the terminal device, wherein the decision comprises one or more of the following: if access to a network is to be restricted for the terminal device; if the terminal device is to be scheduled for a connection establishment; if the terminal device is to be scheduled for a connection resume; identifying a feature support of the terminal device; or determining a modulation and coding scheme the terminal device is capable of using.

According to a fifteenth aspect there is provided a non-transitory computer readable medium comprising program instructions for causing an apparatus to perform at least the following: receive, from a terminal device, a radio resource control request message comprising a temporary terminal device identity that identifies a type of the terminal device, determine if the type of the terminal device is identified from the temporary terminal device identity, and if it is identified, determine, based on the type of the terminal device, a decision regarding the terminal device, wherein the decision comprises one or more of the following: if access to a network is to be restricted for the terminal device; if the terminal device is to be scheduled for a connection establishment; if the terminal device is to be scheduled for a connection resume; identifying a feature support of the terminal device; or determining a modulation and coding scheme the terminal device is capable of using.

According to a sixteenth aspect there is provided non-transitory computer readable medium comprising program instructions stored thereon for performing at least the following: receive, from a terminal device, a radio resource control request message comprising a temporary terminal device identity that identifies a type of the terminal device, determine if the type of the terminal device is identified from the temporary terminal device identity, and if it is identified, determine, based on the type of the terminal device, a decision regarding the terminal device, wherein the decision comprises one or more of the following: if access to a network is to be restricted for the terminal device; if the terminal device is to be scheduled for a connection establishment; if the terminal device is to be scheduled for a connection resume; identifying a feature support of the terminal device; or determining a modulation and coding scheme the terminal device is capable of using.

LIST OF DRAWINGS

In the following, the invention will be described in greater detail with reference to the embodiments and the accompanying drawings, in which FIG. 1 illustrates an exemplary embodiment of a radio access network.

DESCRIPTION OF EMBODIMENTS

Figure 1:
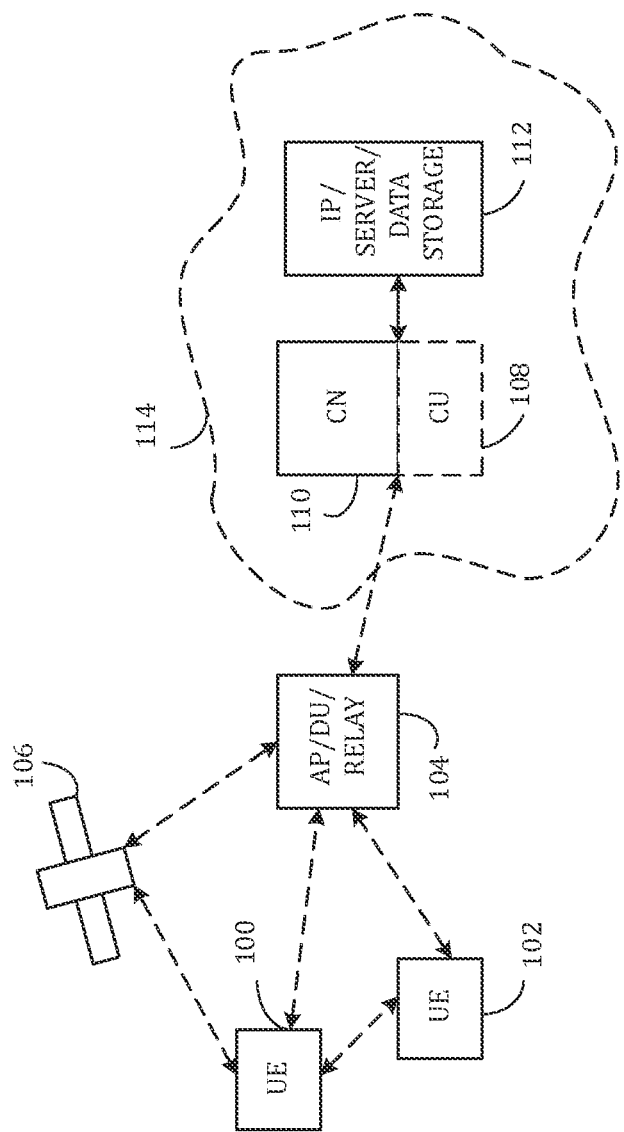

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

As used herein, the term "determining" (and grammatical variants thereof) may include, as a non-exhaustive listing, for example calculating, computing, processing, deriving, measuring, investigating, looking up (e.g., looking up in a table, a database or another data structure), ascertaining and the like. Also, "determining" may include receiving (e.g., receiving information), accessing (e.g., accessing data in a memory), obtaining and the like. Also, "determining" may include resolving, selecting, choosing, establishing, and the like.

FIG. 1 shows terminal devices 100 and 102 configured to be in a wireless connection on one or more communication channels in a cell with an access node (such as (e/g)NodeB) 104 providing the cell. The access node 104 may also be referred to as a node. The physical link from a terminal device to a (e/g)NodeB is called uplink or reverse link and the physical link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), or a user plane function (UPF), for providing connectivity of terminal devices (UEs) to external packet data networks, or mobile management entity (MME), or access and mobility function (AMF) for access and mobility management.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. A terminal device may also be a device having capability to operate in Internet of Things (IoT) network.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 5) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require to bring the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Satellite communication may utilise geostationary earth orbit (GEO) satellite systems, but also low earth orbit (LEO) satellite systems, for example, mega-constellations (systems in which hundreds of (nano)satellites are deployed). Each satellite 106 in the constellation may cover several satellite-enabled network entities that create on-ground cells. The on-ground cells may be created through an on-ground relay node 104 or by a gNB located on-ground or in a satellite or part of the gNB may be on a satellite, the DU for example, and part of the gNB may be on the ground, the CU for example.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc.

Terminal devices may vary greatly in their capabilities, in terms of both hardware and/or software capabilities. For example, wearable devices, such as smart watches or rings, may be much more reduced in their capabilities compared to a laptop or a tablet computer for example. A terminal device with reduced capability may be called as a redcap terminal device. The reduced capabilities may comprise for example reduced number of RX/TX antennas, bandwidth reduction, half duplex frequency division duplex (FDD) relaxed processing time and/or capability. As redcap terminal devices may also have greater need for power saving and enhancing battery lifetime, the following aspects may be taken into account: reduced physical downlink control channel, PDCCH, monitoring by smaller numbers of blind decodes and control channel element, CCE, limits, extended discontinuous reception, DRX, for radio resource control, RRC inactive and/or idle and radio resource management, RRM, relaxation for stationary terminal device. Redcap terminal devices may be useful in various use cases. For example, a redcap terminal device may be used as an industrial wireless sensor, a video surveillance device, an Internet of Things, IoT, device, a wearable device and/or a device used for transportation, tracking, infrastructure, agriculture, smart cities, etc. In some exemplary embodiments, use cases regarding redcap terminal devices may be standardized. For example, there are use case specific requirements specified in 3GPP TR 38.875 stating the following:

Industrial wireless sensors: Reference use cases and requirements are described in TR 22.832 and TS 22.104: Communication service availability is 99.99% and end-to-end latency less than 100 ms. The reference bit rate is less than 2 Mbps (potentially asymmetric e.g. UL heavy traffic) for all use cases and the device is stationary. The battery should last at least few years. For safety related sensors, latency requirement is lower, 5-10 ms (TR 22.804)

Video Surveillance: As described in TS 22.804, reference economic video bitrate would be 2-4 Mbps, latency<500 ms, reliability 99%-99.9%. High-end video e.g. for farming would require 7.5-25 Mbps. It is noted that traffic pattern is dominated by UL transmissions.

Wearables: Reference bitrate for smart wearable application can be 10-50 Mbps in DL and minimum 5 Mbps in UL and peak bit rate of the device higher, up to 150 Mbps for downlink and up to 50 Mbps for uplink. Battery of the device should last multiple days (up to 1-2 weeks).

As the limited capabilities of redcap terminal devices may affect overall performance of a network, it is beneficial if the redcap device is able to identify itself as a redcap device to the network. Thus, an indication in system information may be used to indicate if a redcap terminal device may camp on a cell. The redcap terminal device may identify itself in various manners. For example, during a message, Msg1 transmission, for example using a separate initial uplink bandwidth part, UL BWP, separate physical random access channel, PRACH, resource or PRACH preamble partitioning. Alternatively, for example, the indication may be provided during Msg3 transmission, as a post Msg4 acknowledgement, such as during Msg5 transmission or part of terminal device capability reporting, or during MsgA transmission. If the indication is transmitted during Msg3 transmission, then for example a spare bit of the Msg3 definition may be assigned to indicate if the terminal device is a redcap device. Alternatively, for example, Msg3 size may be extended such that it carries additional one or more bits that identify the terminal device as a redcap device. In yet another alternative, 2-step random access channel, RACH, may be used. In 2-step RACH, the RRC Connection resume request message is included into MsgA and the RRC resume or RRC release message is included into MsgB.

Figure 2:
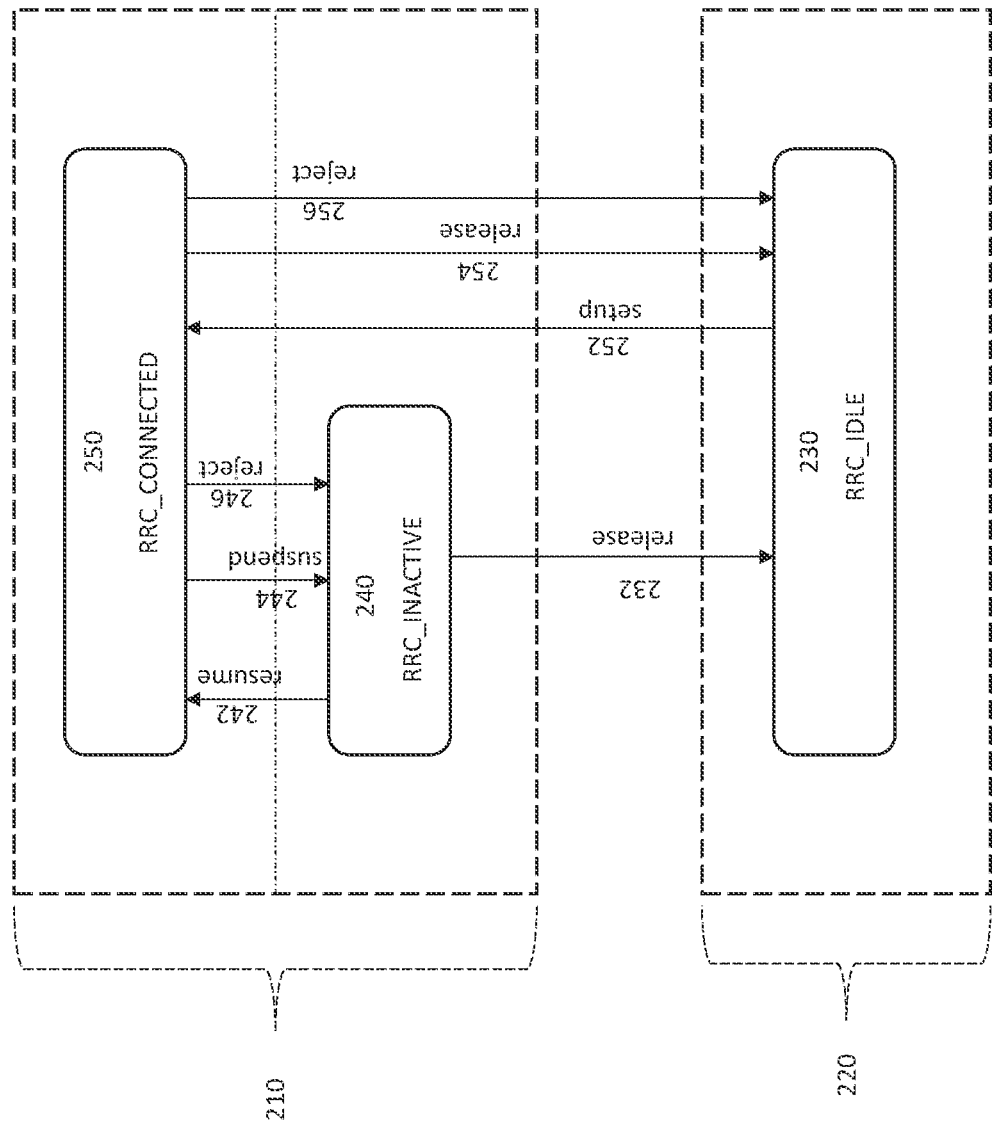
FIG. 2 illustrates an exemplary embodiment of radio resource control states in 5G.

Further, alternatively, the type of the redcap terminal device may be identified when the redcap terminal device transmits Msg3, which may comprise an RRC connection resume request message or an RRC connection setup request message, without using the spare bit of the RRC messages and without extending the RRC messages with additional bits either. It is to be noted that Msg3 may be understood as an RRC connection request message. FIG. 2 illustrates an exemplary embodiment of RRC states in 5G. In this exemplary embodiment, a terminal device may be in a connection management, CM, connected state 210 or in a CM idle 220 state. The RRC states in the CM connected are RRC_CONNECTED 250 and RRC_INACTIVE 240. The RRC state in the CM idle is RRC_IDLE 230. The terminal device transitions to the RRC_IDLE state 230 after receiving release signaling 232 or 254, or after receiving reject signaling 256. From the RRC_IDLE state the terminal device may transition to RRC_CONNECTED 250 state via setup 232 signaling. The terminal device may transition to the RRC_INACTIVE 240 state after receiving signaling suspend 244 or reject 246. From the RRC_INACTIVE 240 state the terminal device may transition to an RRC_CONNECTED 250 state via resume 242 signaling.

The RRC_INACTIVE 240 state may reduce power consumption of the terminal device by alleviating the control plane, CP, procedures required at the RRC state change and associated latency. When a terminal device is in RRC_INACTIVE 240 state, the radio connection is suspended, but the core network connectivity is maintained active. In other words, the terminal device is kept in the CM-CONNECTED state. Access stratum, AS context may be stored at both the terminal device and radio access network, RAN, sides to enable fast resume of a suspended connection, including the latest radio bearer configuration used for the data/signaling transmission, and the security keys and algorithms for integrity protection and ciphering in the radio interface. Based on this retained information, the terminal device may resume the radio connection with a lower delay and associated signaling overhead compared to for example the RRC_IDLE 230 state for which a new connection to both the radio and core network is to be established.

The terminal device in the RRC_INACTIVE 240 state may be configured by the last serving access node, such as a gNB, with a unique identifier and a RAN-based notification area, RNA, that is specific to the terminal device. The unique RRC identifier may comprise an inactive radio network temporary identifier, I-RNTI, which identifies both the last serving access node, that may be understood as an anchor access node, in which the UA AS context is stored, and the terminal device itself. Two types of I-RNTIs, a full I-RNTI comprising 40 bits, and a short I-RNTI comprising 24 bits, may be defined. The network may inform the terminal device in system information block #1, SIB 1, which I-RNTI is to be used when resuming the connection. The network may use full I-RNTI as part of PagingUE-Identity within the Paging message. The RNA may cover a single or multiple cell(s), belonging to one or multiple access node such as gNBs. Inside this area, the terminal device may move without any notification to the network about its location i.e. cell (re)-selections within the RNA are transparent to the network. The network may page the terminal device with RAN-level paging from any cell within the RNA.

In some exemplary embodiments, the type of the terminal device may be identified using I-RNTI, which may be understood to be comprised in a temporary terminal device identity, that has been assigned by an anchor access node such as an anchor gNB. In other words, the anchor access node is responsible for allocating the I-RNTI to the terminal device. The type of the terminal device may be understood as identifying if the terminal device is a redcap terminal device or not, in case the terminal device is a redcap terminal device, which type of a redcap terminal device it is, such as type 1, type 2 or type 3, and/or if the terminal device has certain feature support such as bandwidth limitation. It is to be noted that the type of the terminal device may also indicate capability of the terminal device. For example, the type of the terminal device may comprise terminal device capability of usable receiver chains, Rx chains. Further, the type of the terminal device capable of using Rx chains, the type of the terminal device may identify if the terminal device supports 1 Rx chain or 2 Rx chains for example. As the terminal device transmits, from an RRC Inactive state, an RRC message including I-RNTI, such as RRCResumeRequest or RRCResumeRequest1, the terminal device may at the same time identify its type to the access node receiving the RRC message as the I-RNTI has been assigned by the anchor gNB while suspending the RRC connection with RRCRelease message.

Figure 3A:
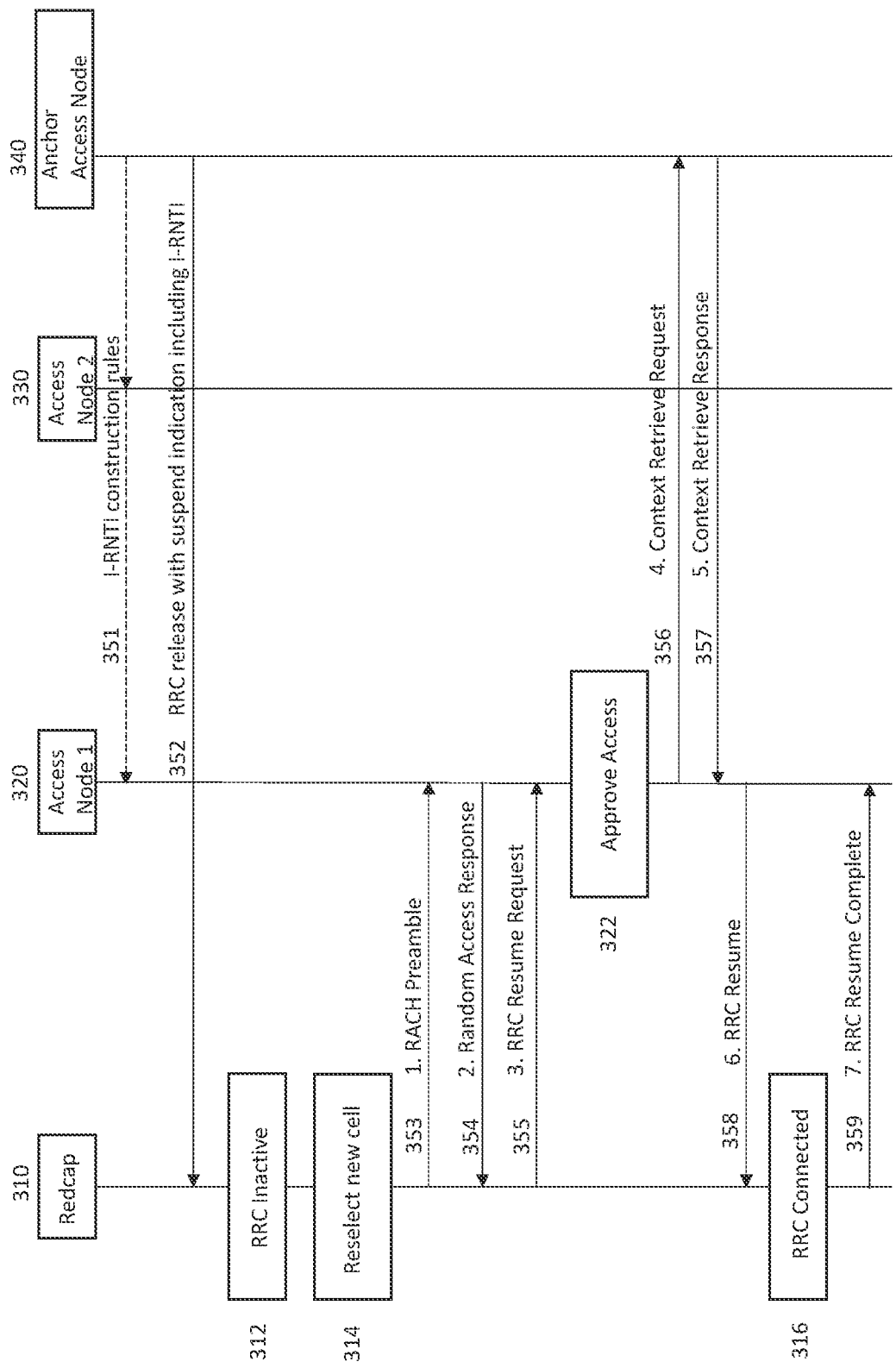
FIG. 3A-3C illustrate exemplary embodiments of signaling.

FIG. 3A illustrates an exemplary embodiment in which a terminal device identifies its type and resumes RRC connection successfully after an RRC inactive state. First, an access node 340, such as an anchor e/gNB assigns the type for the terminal device. As mentioned above, the type may indicate if the terminal device is a redcap device and/or identify feature support provided by the terminal device. The type is constructed according to I-RNTI construction rules and indicated using indication 351 to neighboring access nodes 320 and 330, such as neighbouring e/gNBs. The I-RNTI is also assigned, in line with the advertised construction rules, by the anchor access node 340 to the terminal device in transmission 352 in which an RRC Release with suspend indication message is transmitted to the terminal device 310, which in this exemplary embodiment is a redcap terminal device.

In addition to the terminal device type information, the I-RNTI may, optionally, comprise one bit from a terminal device specific part that may be used to indicate if the terminal device is a redcap terminal device or another type of terminal device. For example, if a least significant bit, LSB, is "0", that may be used to indicate that the terminal device is not a redcap terminal device and on the other hand, if the LSB is "1", that may be used to indicate that the terminal device is a redcap terminal device. Alternatively, more bits from the terminal device specific part could be used to distinguish further different redcap terminal device types such as redcap terminal device type 1, redcap terminal device type 2, redcap terminal device type 3, etc. These types may identify in a more specific manner the reduced capability of the terminal device. As a further option, a range of I-RNTIs may be dedicated for redcap terminal device and may be used for terminal device type identification, etc. This range may be adjusted depending on the fraction of redcap terminal devices allowed per access node. For example, 5% of the lowest terminal device specific reference may be dedicated for redcap terminal device identification.

In yet another alternative, a pattern of bits may be utilized for identifying the type of the terminal device. The pattern may be adjusted depending on the fraction of I-RNTI dedicated for redcap terminal devices per an access node. For example, if the first 4 bits of the terminal device specific reference is 0101, then that identifies the terminal device as a redcap terminal device. In yet another alternative, a new field may be added to the I-RNTI reference profile to indicate terminal device type and feature(s) support. For example, the terminal device specific reference field, which may be 20 or 24 bits, may be sub-divided into new terminal device specific reference field, that is 19 or 23 bits, and to a terminal device type index field comprising 1 bit. Further, in yet another alternative, one or more bits from the network specific part can be used to indicate if the terminal device is a redcap terminal device or another type of terminal device.

As mentioned, the type of the terminal device indicated by the I-RNTI may further, additionally, or alternatively, indicate feature support information, such as whether certain features supported or not by the terminal device. The feature support information may be for example information related to scheduling i.e. BW support information, such as maximum supported BW, relaxed processing delays etc.

It is to be noted that the I-RNTI construction rules may be according to a standard or may be according to a specific network implementation. If the construction rules are defined by the network, then the anchor access node 340 may exchange information with neighboring RANs 320 and 330 via Xn signaling, for example, regarding how to interpret the I-RNTI and how to recover the carried information on terminal device type identification.

In the exemplary embodiment according to FIG. 3A, after the terminal device 310 has received the transmission 352 comprising the RRC release with suspend indication message including I-RNTI, the terminal device transitions to an RRC Inactive state 312. After this, the terminal device 310 reselects a new cell 314 and thus transmits a random access channel, RACH, preamble in transmission 353 to an access node 320, such as a gNB, that is comprised in the neighbor RAN. The access node 320 then transmits a Random access response in transmission 354. After this, the terminal device 310 transmits, to the access node 320, an RRC Resume Request in the transmission 355. The transmission 355 is an RRC message that now comprises the I-RNTI value based on which the access node 320 may identify the type of the terminal device 310. The access node 320 may utilize the information regarding the type of the terminal device for example when scheduling the terminal device 310 in connection establishment/resume phase or during small data transmission, SDT, procedure, for determining whether the terminal device can access the cell, for determining feature set, such as which MCS table to use, etc. In some exemplary embodiments, the usage of some bits in I-RNTI may be defined in a standard. Alternatively, if the usage of bits in the I-RNTI is not defined in a standard, the information on how to interpret the I-RNTI and how to recover the carried information on terminal device type should be exchanged between neighboring access nodes to avoid any mismatch, ie., Xn signaling could be defined for the purpose. It is to be noted that the I-RNTI may comprises a full I-RNTI or a short I-RNTI and more information may be included in the full I-RNTI than in the short I-RNTI.

The access node 320 may then, based on the received RRC Resume Request message, determine the type of the terminal device and determine, if the terminal device is approved to access the RAN the access node is comprised in. It is to be noted that it may be determined by the network implementation whether to take advantage of the all the information encoded in full I-RNTI or whether to use short I-RNTI for example, to extend coverage for INACTIVE terminal devices. Thus, the access node 340 may provide an indication to the terminal device 310 regarding if a full or a short format of the I-RNTI is used. In some exemplary embodiments, the redcap terminal device may always use full I-RNTI regardless whether useFullResumeID is signaled in system information block, SIB 1. RAN may then know based on the used I-RNTI whether the terminal device is a RedCap terminal device or not i.e. a non-redcap terminal device would use short I-RNTI and a redcap terminal device full I-RNTI. It is to be noted that the approach for I-RNTI may also be used for any other temporary ID allocated by the network to the terminal device. For example, serving temporary mobile subscriber ID, S-TMSI, in which case the embodiments are applicable to IDLE mode terminal devices as well. A S-TMSI, may be comprised in a temporary terminal device ID.

It is to be noted that from an RRC Inactive or RRC Idle state, a terminal device may initiate to resume a connection to the access node from which the temporary terminal device identity was received. The terminal device may then transmit the RRC request comprising the temporary terminal device identity to that access node. Alternatively, the terminal device may reselect a cell and thus transmit the RRC request comprising the temporary terminal device identity to the access node that operates the cell that was reselected. As an access node, which may be different from the access node from which the temporary terminal device identity was received or the access node operating the reselected cell, receives the RRC request comprising the temporary terminal device identity, it may then determine the type of the terminal device. Based on the type of the terminal device, the access node may then determine a decision regarding the terminal device. The decision may be one or more of the following:

if the terminal device is allowed the radio resource control request based on the determined type of the terminal device;
if access to a network is to be restricted for the terminal device;
if the terminal device is to be scheduled for a connection establishment;
if the terminal device is to be scheduled for a connection resume;
identifying a feature support of the terminal device; or
determining a modulation and coding scheme the terminal device is capable of using In the exemplary embodiment of FIG. 3A, once the access node 310 has determined that the terminal device 310 is allowed to connect to the access node 310, the access node 310 may transmit a transmission 356 to the anchor access node 340, wherein the transmission 356 comprises a context retrieve request. The anchor access node 340 then transmits a transmission 357 to the access node 320. The transmission 357 comprises a context retrieve response message. After receiving the transmission 357, the access node 320 transmits a transmission 358 comprising a RRC Resume message to the terminal device 310. After receiving the transmission 358, the terminal device 310 transitions to a RRC connected state 316 and transmits transmission 359 comprising RRC resume compete message to the access node 320.

Table 1 below provides an example of the partitioning of a 40 bit I-RNTI that identifies a type of a terminal device. This partitioning is an example of the partitioning that the exemplary embodiments described herein could utilize:

TABLE 1

| Profile ID | UE specific reference | UE type index | NG-RAN node address index (e.g., gNB ID, eNB ID) | RAT-specific information | PLMN-specific information | Comment |
|---|---|---|---|---|---|---|
| 1 | 19 bits (~0.5 million values) | 1 bit (REDCAP or NON-REDCAP UE) | 20 bits (~1 million values) | N/A | N/A | NG-RAN node address index may be very well represented by the LSBs of the gNB ID. This profile may be applicable for any NG-RAN RAT. |
| 2 | 19 bits (~0.5 million values) | 1 bit (REDCAP or NON-REDCAP UE) | 16 bits (65.000 nodes) | N/A | 4 bits (Max 16 PLMNs) | Max number of PLMN IDs broadcast in NR is 12. This profile may be applicable for any NG-RAN RAT. |
| 3 | 23 bits (~8 million values) | 1 bit (REDCAP or NON-REDCAP UE) | 16 bits (65.000 nodes) | N/A | N/A | Reduced node address to maximise addressable UE contexts. This profile may be applicable for any NG-RAN RAT. |

Figure 3B:
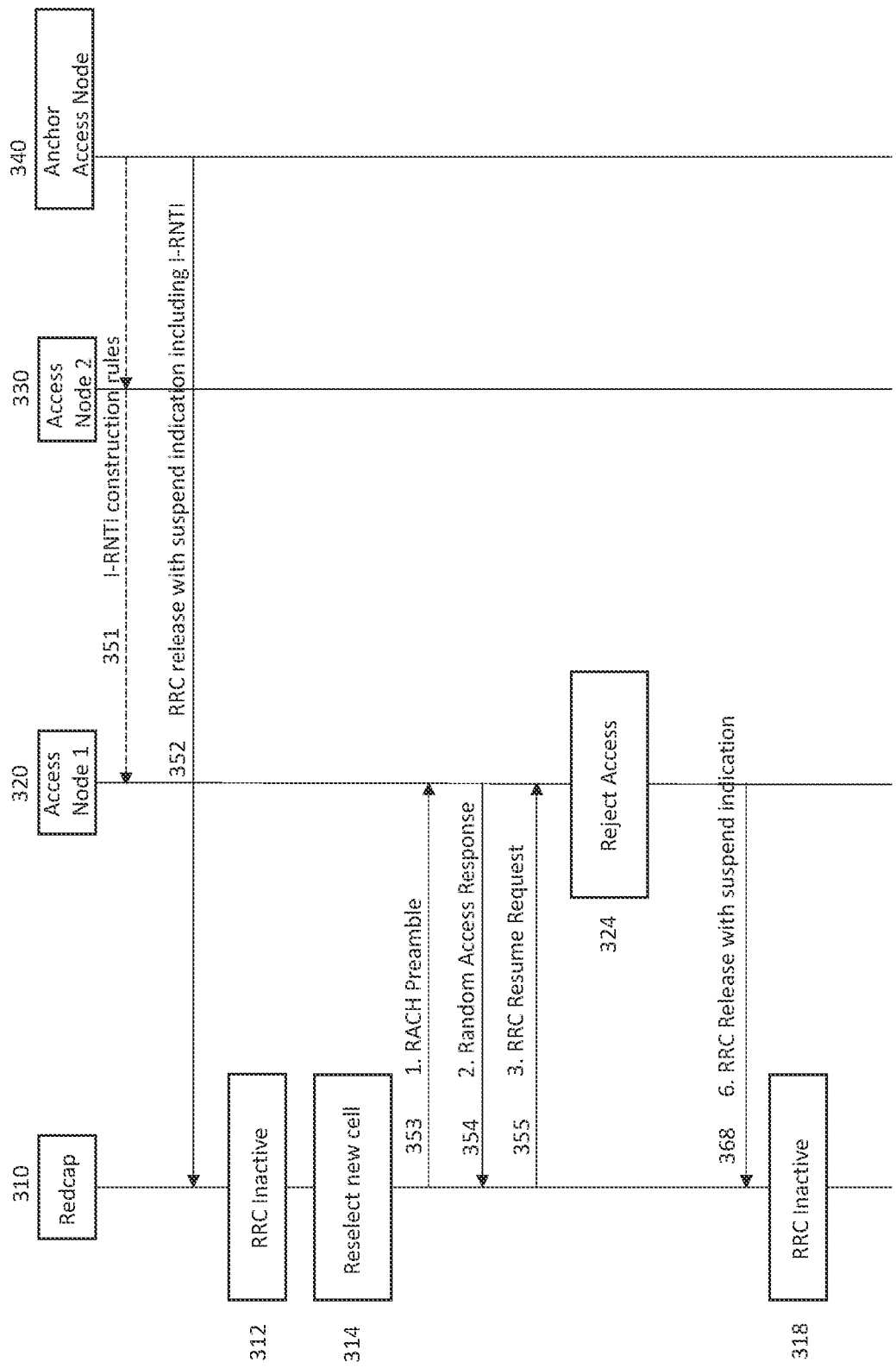

FIG. 3B illustrates an exemplary embodiment that is corresponding to that of the exemplary embodiment 3A except that the access node 320 determines that the terminal device 310 is not allowed to connect 324 and thus rejects the access request by transmitting a transmission 368 comprising a RRC release with suspend indication message. The access node 320 may determine to reject the access for example based on the current network load.

Figure 3C:
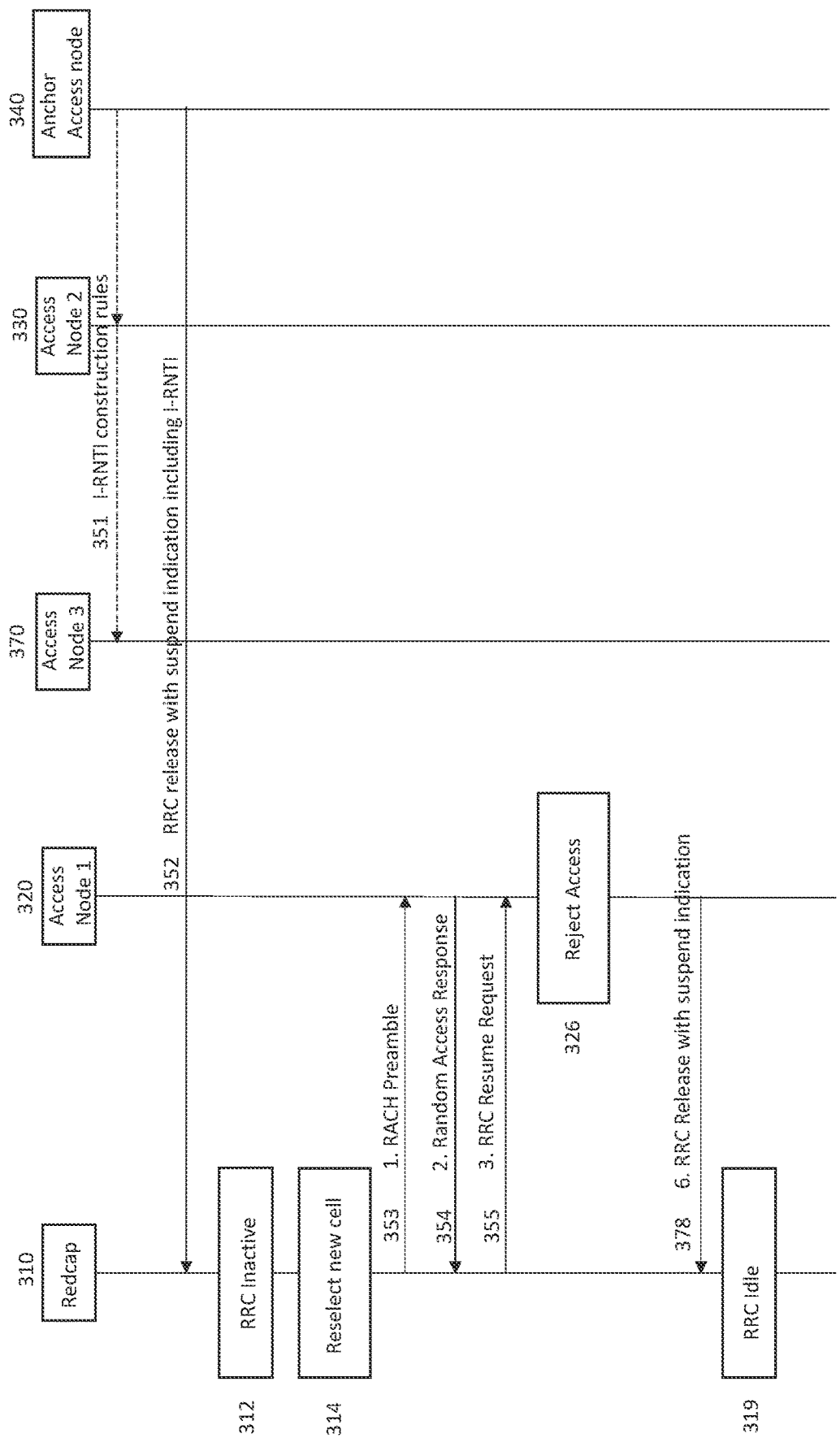

FIG. 3C illustrates an exemplary embodiment corresponding to the exemplary embodiment of FIG. 3B except that in this exemplary embodiment, the access node 310 is not able to interpret the I-RNTI 326 and to recover the carried information on the terminal device 310 type. This is due to the I-RNTI Construction rules transmission 351 failing to be received by the access node 310. This may be due to due to lack of Xn direct connectivity with the anchor access node 340 for example. In this exemplary embodiment, there is an additional neighbor RAN comprising an access node 370 that receives the transmission 351 in addition to the access node 330 receiving the transmission 351. As the access node 320 fails to interpret the I-RNTI 326, the access node 310 transmits transmission 378 comprising a RRC release message to the terminal device 310 and the terminal device 310 transitions to the RRC Idle state 319.

The exemplary embodiment described above may have the advantage that based on the configured/signaled I-RNTI, a RAN is able to identify a redcap terminal device, in some examples also the redcap type of the terminal device from a legacy 5G terminal device or terminal device support for certain features without any additional bits to be included in Msg3 and/or without using the only spare bit in Msg3. As the anchor RAN sets the I-RNTI values and the terminal device includes the received I-RNTI value in the RRC Resume Request message, the exemplary embodiments described above are transparent to legacy terminal devices. Further, there is no need for the target access node to retrieve the terminal device context for MSG4 transmission, thereby achieving lower signaling latency.

In general, a temporary terminal device identity may be allocated by a network node, that may be understood as an anchor network node, to a terminal device. The network node may be an access node, such as a gNB. Such access node may then use an RRC release message with the temporary terminal device identity to allocate the temporary terminal device identity. As the temporary terminal device identity is allocates by an access node, it may comprise a I-RNTI.

Alternatively, the network node may be understood as an AMF. The AMF may then allocate a temporary terminal device identity that comprises a S-TMSI. The temporary terminal device identity may be transmitted, by the AMF, over NAS to the terminal device.

Figure 4:
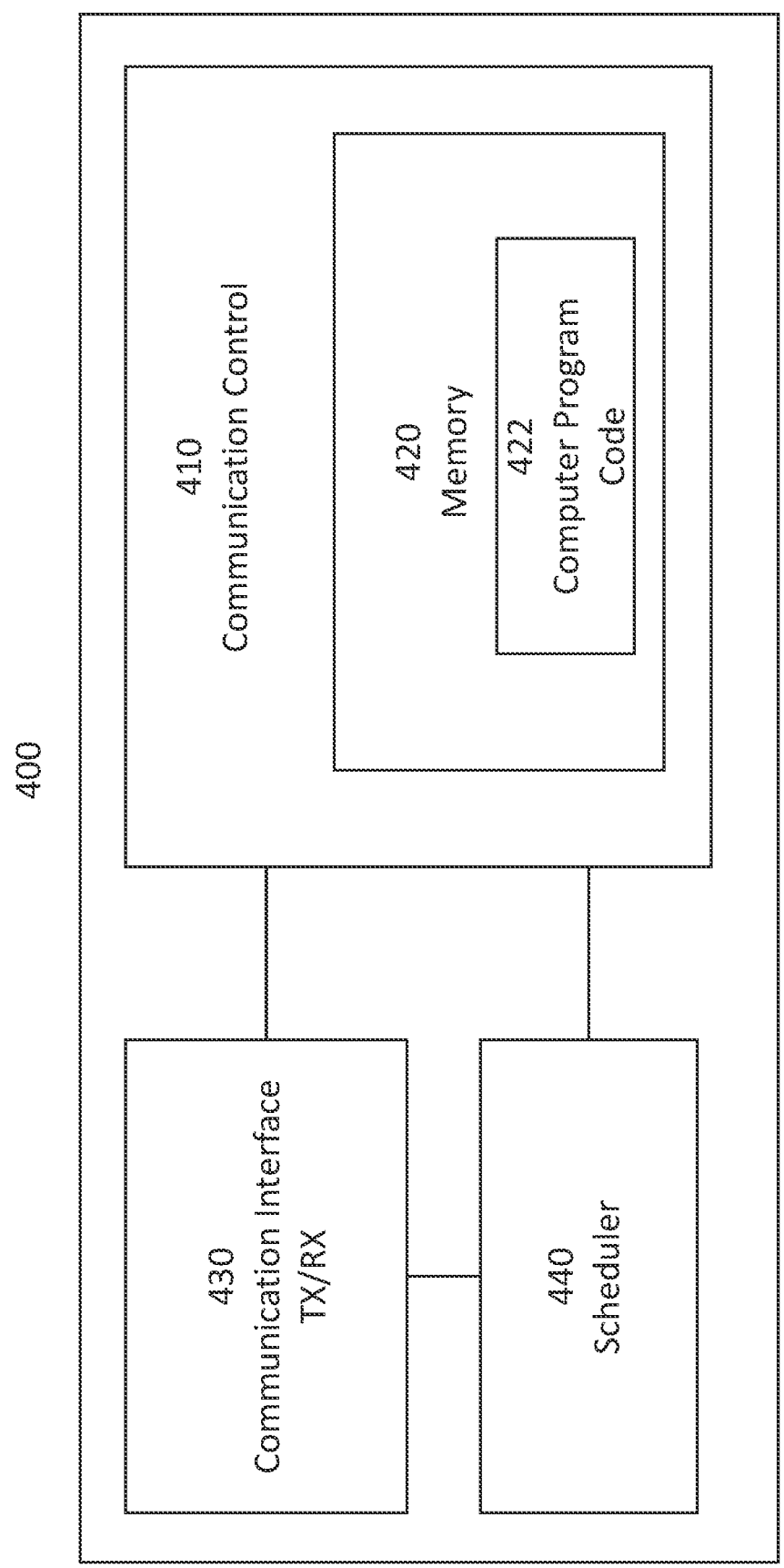
FIG. 4 and FIG. 5 illustrate exemplary embodiments of an apparatus.

The apparatus 400 of FIG. 4 illustrates an example embodiment of an apparatus that may be an access node or be comprised in an access node. The apparatus may be, for example, a circuitry or a chipset applicable to an access node to realize the described embodiments. The apparatus 400 may be an electronic device comprising one or more electronic circuitries. The apparatus 400 may comprise a communication control circuitry 410 such as at least one processor, and at least one memory 420 including a computer program code (software) 422 wherein the at least one memory and the computer program code (software) 422 are configured, with the at least one processor, to cause the apparatus 400 to carry out any one of the example embodiments of the access node described above.

The memory 420 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus 400 may further comprise a communication interface 430 comprising hardware and/or software for realizing communication connectivity according to one or more communication protocols. The communication interface 430 may provide the apparatus with radio communication capabilities to communicate in the cellular communication system. The communication interface may, for example, provide a radio interface to terminal devices. The apparatus 400 may further comprise another interface towards a core network such as the network coordinator apparatus and/or to the access nodes of the cellular communication system. The apparatus 400 may further comprise a scheduler 440 that is configured to allocate resources.

Figure 5:
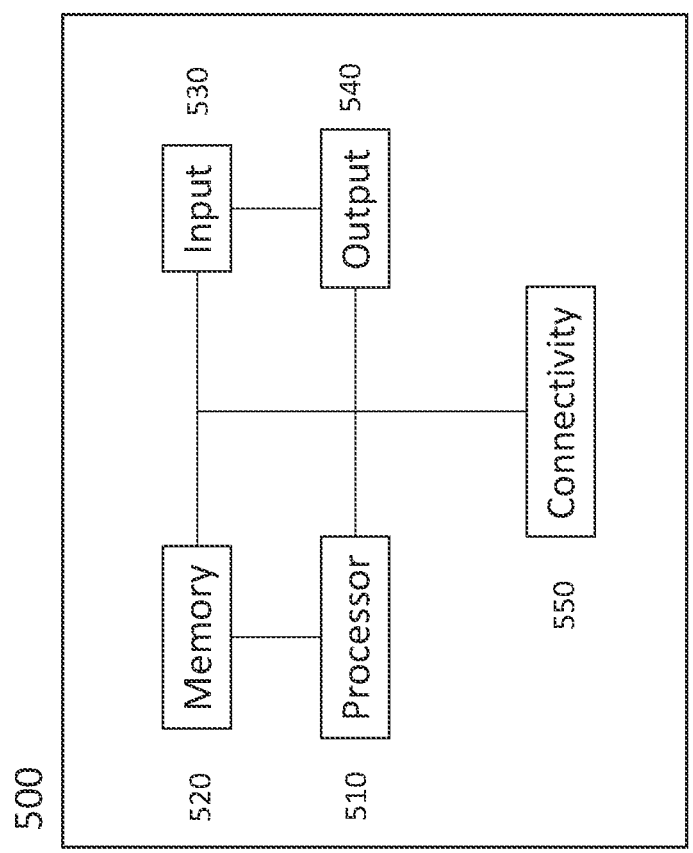

FIG. 5 illustrates an exemplary embodiment of an apparatus that may be comprised in, or connected to, a terminal device that may be a redcap terminal device. A receiving and/or transmitting unit as described above, may be comprised in the device as well. The apparatus 500 comprises a processor 510. The processor 510 interprets computer program instructions and process data. The processor 610 may comprise one or more programmable processors. The processor 510 may comprise programmable hardware with embedded firmware and may, alternatively or additionally, comprise one or more application specific integrated circuits, ASICs.

The processor 510 is coupled to a memory 520. The processor is configured to read and write data to and from the memory 520. The memory 520 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 520 stores computer readable instructions that are execute by the processor 510. For example, non-volatile memory stores the computer readable instructions and the processor 510 executes the instructions using volatile memory for temporary storage of data and/or instructions.

The computer readable instructions may have been pre-stored to the memory 520 or, alternatively or additionally, they may be received, by the apparatus, via electromagnetic carrier signal and/or may be copied from a physical entity such as computer program product. Execution of the computer readable instructions causes the apparatus 500 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 500 further comprises, or is connected to, an input unit 530. The input unit 530 comprises one or more interfaces for receiving a user input. The apparatus 500 also comprises an output unit 540. The apparatus 500 may further comprise a connectivity unit 550. The connectivity unit 550 enables wired and/or wireless connectivity to external networks. The connectivity unit 550 may comprise one or more antennas and one or more receivers that may be integrated to the apparatus 500 or the apparatus 500 may be connected to. The connectivity unit 550 may comprise an integrated circuit or a set of integrated circuits that provide the wireless communication capability for the apparatus 500. Alternatively, the wireless connectivity may be a hardwired application specific integrated circuit, ASIC.

It is to be noted that the apparatus 500 may further comprise various component not illustrated in the FIG. 5. The various components may be hardware component and/or software components.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising at least one processor, and at least one memory including a computer program code, wherein the at least one memory and the computer program code are configured, with the at least one processor, to cause the apparatus to:
   receive, from a network node, a temporary terminal device identity that identifies a type of a terminal device;
   transition to a radio resource control inactive state or to a radio resource control idle state; and
   transmit a radio resource control request message comprising the temporary terminal device identity that identifies a type of a terminal device, wherein the radio resource control request message comprises:
   a radio resource control connection resume request message, if the transition was to the radio resource control inactive state; or
   a radio resource control setup request message if the transition was to the radio resource control idle state;
   wherein the temporary terminal device identity comprises an inactive radio network temporary identity if the transitioning was to the radio resource control inactive state or a temporary mobile subscriber identity if the transitioning was to the radio resource control idle state;
   and wherein, in case the temporary terminal device identity comprises the inactive radio network temporary identity, the apparatus is further caused to:
   transmit the inactive radio network temporary identity as a full inactive radio network temporary identity to indicate that the terminal device is a reduced capability device; or
   transmit the inactive radio network temporary identity as a short inactive radio network temporary identity to indicate that the terminal device is not a reduced capability device, wherein the short inactive radio network temporary identity has fewer bits than the full inactive radio network temporary identity.

2. An apparatus according to claim 1, wherein the apparatus is further caused to transmit the radio resource control request message to the network node; or
   the apparatus further caused to reselect a cell and the radio resource control connection request message is transmitted to an access node providing the cell.

3. An apparatus according to claim 1, wherein the type of the terminal device identifies if the terminal device is a reduced capability terminal device and/or the type of the terminal device identifies feature support of the terminal device.

4. An apparatus according to claim 1, wherein the identifying the type of a terminal device comprises one of the following:
   one bit from a terminal device specific part to identify the type of the terminal device;
   a plurality of bits from the terminal device specific part to identify the type of reduced capability of the terminal device;
   a range of the inactive radio network temporary identity dedicated to identifying the type of the terminal device;
   a pattern of bits to identify the type of the terminal device;
   one or more bits from a network specific part to identify the type of the terminal device; or
   a field in the inactive radio network temporary identity to identify the type of the terminal device.

5. An apparatus according to claim 1, wherein the apparatus is, or is comprised in the terminal device.

6. An apparatus comprising at least one processor, and at least one memory including a computer program code, wherein the at least one memory and the computer program code are configured, with the at least one processor, to cause the apparatus to:
   receive, from a terminal device, a radio resource control request message comprising a temporary terminal device identity that identifies a type of the terminal device; and
   determine the type of the terminal device from the temporary terminal device identity;
   wherein the temporary terminal device identity comprises an inactive radio network temporary identity if the transitioning was to the radio resource control inactive state or a temporary mobile subscriber identity if the transitioning was to the radio resource control idle state;
   and wherein, in case the temporary terminal device identity comprises the inactive radio network temporary identity, the apparatus is further caused to:
   receive the inactive radio network temporary identity as a full inactive radio network temporary identity to indicate that the terminal device is a reduced capability device; or
   receive the inactive radio network temporary identity as a short inactive radio network temporary identity to indicate that the terminal device is not a reduced capability device, wherein the short inactive radio network temporary identity has fewer bits than the full inactive radio network temporary identity.

7. An apparatus according to claim 6, wherein the apparatus is further caused to:
   receive, from an anchor network node, wherein the anchor network node is responsible for allocating the temporary terminal device identity to the terminal device, information indicative of a construction rule of the temporary terminal device identity; and identify the type of the terminal device from the temporary terminal device identity.

8. An apparatus according to claim 6, wherein if it is determined that the access of terminal device to the network is allowed, the apparatus is further caused to transmit a context retrieve request message to an anchor network node and receive, from the anchor network node, a context retrieve response message.

9. An apparatus according to claim 6, wherein the identifying the type of a terminal device comprises one of the following:
one bit from a terminal device specific part to identify the type of the terminal device;
a plurality of bits from the terminal device specific part to identify the type of reduced capability of the terminal device;
a range of the inactive radio network temporary identity dedicated to identifying the type of the terminal device;
a pattern of bits to identify the type of the terminal device;
one or more bits from a network specific part to identify the type of the terminal device; or
a field in the inactive radio network temporary identity to identify the type of the terminal device.

10. An apparatus according to claim 6, wherein the radio resource control message request comprises a radio resource control connection resume request message, and the temporary terminal device identity comprises an inactive radio network temporary identity.

11. An apparatus according to claim 6, wherein the radio resource control request message comprises a radio resource control setup request message and the temporary terminal device identity comprises a temporary mobile subscriber identity.

12. An apparatus according to claim 6, wherein the apparatus is further caused to determine, based on the temporary terminal device identity, if the terminal device is a reduced capability terminal device.

13. An apparatus according to claim 12, wherein the temporary terminal device identity comprises the inactive radio network temporary identity and the apparatus is further caused to:
determine that the terminal device is the reduced capability terminal device if the inactive radio network temporary identity is a full inactive radio network temporary identity; or
determine that the terminal device is not the reduced capability terminal device if the inactive radio network temporary identity is a short inactive radio network temporary identity.

14. An apparatus according to claim 6, wherein if the type of the terminal device is not identified from the temporary terminal device identity, transmit a radio resource control release message to the terminal device.

15. An apparatus according to claim 6, wherein the apparatus is comprised in or connected to a network node.

16. A method comprising:
receiving, from a network node, a temporary terminal device identity that identifies a type of a terminal device;
transitioning to a radio resource control inactive state or to a radio resource control idle state; and
transmitting a radio resource control request message comprising the temporary terminal device identity that identifies a type of a terminal device, wherein the radio resource control request message comprises:
a radio resource control connection resume request message, if the transition was to the radio resource control inactive state; or
a radio resource control setup request message if the transition was to the radio resource control idle state;
wherein the temporary terminal device identity comprises an inactive radio network temporary identity if the transitioning was to the radio resource control inactive state or a temporary mobile subscriber identity if the transitioning was to the radio resource control idle state;
and wherein, in case the temporary terminal device identity comprises the inactive radio network temporary identity, the method further comprising:
transmitting the inactive radio network temporary identity as a full inactive radio network temporary identity to indicate that the terminal device is a reduced capability device; or
transmitting the inactive radio network temporary identity as a short inactive radio network temporary identity to indicate that the terminal device is not a reduced capability device,
wherein the short inactive radio network temporary identity has fewer bits than the full inactive radio network temporary identity.

17. A method comprising:
receiving, from a terminal device, a radio resource control request message comprising a temporary terminal device identity that identifies a type of the terminal device; and
determining the type of the terminal device from the temporary terminal device identity, and if it is identified;
wherein the temporary terminal device identity comprises an inactive radio network temporary identity if the transitioning was to the radio resource control inactive state or a temporary mobile subscriber identity if the transitioning was to the radio resource control idle state;
and wherein, in case the temporary terminal device identity comprises the inactive radio network temporary identity, the method further comprising:
receiving the inactive radio network temporary identity as a full inactive radio network temporary identity to indicate that the terminal device is a reduced capability device; or
receiving the inactive radio network temporary identity as a short inactive radio network temporary identity to indicate that the terminal device is not a reduced capability device, wherein the short inactive radio network temporary identity has fewer bits than the full inactive radio network temporary identity.

* * * * *